Feb. 24, 1925.

W. W. WILDMAN

PROCESS OF MAKING SELF SEALING TIRE TUBES

Filed June 16, 1921

1,527,720

Inventor
W. W. WILDMAN

By Fisher Stewart
Attorneys

Patented Feb. 24, 1925.

1,527,720

UNITED STATES PATENT OFFICE.

WILLIAM W. WILDMAN, OF BAY CITY, MICHIGAN, ASSIGNOR TO THE WILDMAN RUBBER COMPANY, OF BAY CITY, MICHIGAN, A CORPORATION OF DELAWARE.

PROCESS OF MAKING SELF-SEALING TIRE TUBES.

Application filed June 16, 1921. Serial No. 478,053.

*To all whom it may concern:*

Be it known that I, WILLIAM W. WILDMAN, a citizen of the United States, residing at Bay City, in the county of Bay and State of Michigan, have invented certain new and useful Improvements in a Process of Making Self-Sealing Tire Tubes, of which the following is a specification.

Figure 1:
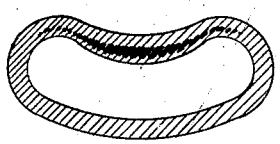
Figure 2:
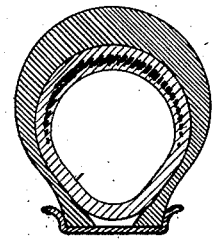
Figure 3:
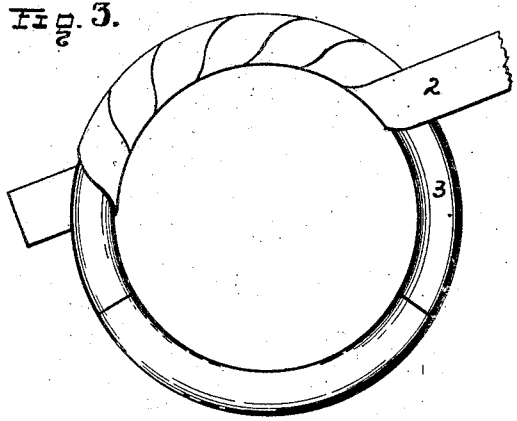
Figure 4:
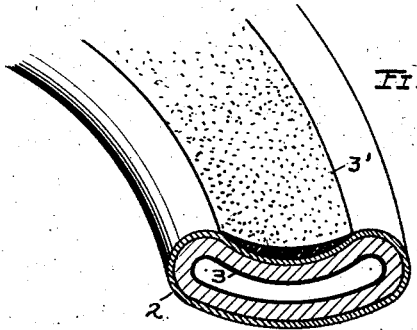
Figure 5:
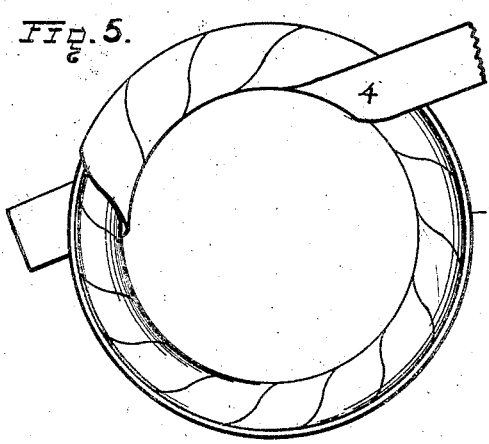
Figure 6:
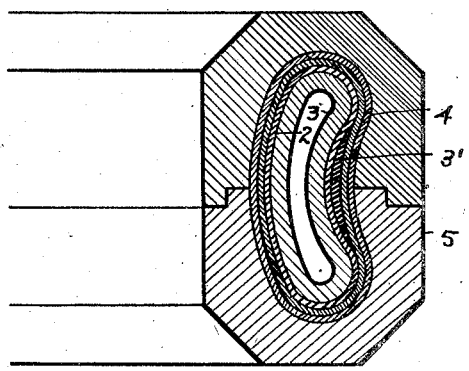

The invention herein consists of a new and useful process of making a rubber tire tube in a kidney shape and with an interlayer of viscous or gummy material in its tread portion so that any cuts and punctures received in use will be automatically sealed and closed while the tube is inflated and expanded beyond its normal shape and diameter. In Fig. 1 of the accompanying drawing, I show a cross section of a tire tube made according to my invention, showing the normal shape of the tube as it appears when deflated, and Fig. 2 is a corresponding view showing the tube inflated and expanded within a tire casing. Fig. 3 is a reduced side view of a kidney-shaped core illustrating the first wrapping step, and Fig. 4 is a slightly enlarged cross section of the wrapped core illustrating the application of the gummy strip to the first wrapper. Fig. 5 is a view corresponding to Fig. 3 showing the disposition of the outer ply or layer of rubber upon the first and second wrapper and strip. Fig. 6 is a cross section of a portion of a vulcanizing mold containing a wrapped core.

In practicing the present process, the first step consists in applying a thin piece of strip 2 of rubber compounded with a vulcanizing element such as sulphur, upon a collapsible circular core 3 which is concavo-convex in cross section to permit a substantially kidney-shaped tube to be built up and molded thereon. Strip 2 may be applied in various ways to core 3 so as to envelop it snugly and completely, using a hand roller to press and shape the soft pliable rubber to conform to the core, and in Fig. 3 strip 2 is shown as being wrapped spirally around the core to form an endless tube eventually. Upon the completion of this first step a second strip 3′ of raw gum or rubber without sulphur or other vulcanizing substance is placed circumferentially within the concaved side of the wrapped core, this strip being preferably graduated or tapered in thickness at each side of its longitudinal central portion to create a thicker or heavier central circumferential portion for the tube. For example, strip 3 may be approximately one-fourth of an inch thick at its center and taper to about one-eighth of an inch at each edge. This superposition of strips having been effected I wrap a third strip 4 of rubber containing sulphur or its equivalent around the other two strips, either circumferentially or spirally, and this third strip may be twice as thick as the first strip, or of approximately the same thickness and wrapped with a plural number of folds, to provide a thicker and heavier vulcanizable layer upon the outside of the tube than upon its inside. The kidney-shaped core with its correspondingly-shaped wrapping is then placed within a separable mold 5 and subjected to heat and pressure within a vulcanizing press until the vulcanizable portions of the tube have been cured or vulcanized, and the period of time required and the heat and pressure used in this proceeding may vary according to the kind of rubber compound employed and may follow the general practices known to those skilled in this art.

When vulcanization has taken place the tube and core are removed from the mold and the tube severed transversely or slit or cut lengthwise at some point to permit it to be stripped from the sectional core, and then the usual air valve is affixed and the severed or cut places spliced or united together in any suitable way. The finished tube is endless or ring-shaped and is of kidney shape in cross section so that the interlayer of unvulcanized viscous rubber will be placed in a state of compression and constriction between the outer and inner elastic portions of the tube when the tube is inflated with air and stretched and expanded to fit the tire casing. In inflating the tube the concaved circumference is pressed outwardly and becomes convex so that if the tube is cut or punctured by nails or other elements forced through the tread of the tire casing, the raw gum will seal and close the punctured place under the tension from opposite sides in the wall of the tube itself, and the tube can be deflated to its normal kidney-shape before this tension on the raw gum is abated or released.

What I claim is:

1. A process of making a self-sealing tire tube in a kidney-shape, consisting in wrapping a strip of vulcanizable rubber around a circular core of kidney-shape in cross section; in applying a strip of raw rubber without vulcanizing material within the circumferential concaved side of said wrapping and core; in wrapping an additional ply of vulcanizable rubber around the previously applied strips; in placing said core and its wrapping together within a vulcanizing mold and applying heat and pressure until the rubber strips have been homogeneously united; and in removing said core from the rubber tube and forming an endless tube adapted to be inflated.

2. A process of making an inflatable self-sealing tire tube, consisting in wrapping a strip of vulcanizable rubber around a circular core until a circular tube having a plural number of plies is produced; in applying a strip of raw unvulcanizable rubber circumferentially around the wrapped plies on the core; in wrapping a ply of vulcanizable rubber around the said strip and first ply until such ply is completely enveloped; in placing the wrapped core within a mold and subjecting said elements together by pressure and heat until the vulcanizable rubber plies are cured and the separate plies homogeneously united together; and in removing the core from the vulcanized tube and forming an inflatable tube.

3. A process of making an inflatable self-sealing tire tube, consisting in wrapping a strip of vulcanizable rubber spirally around a ring-shaped member until a circular tube is produced; in applying a strip of unvulcanizable rubber circumferentially upon said spiral wrapping of rubber; in wrapping an additional strip of vulcanizable rubber spirally around said first wrapping and said circumferential strip; in placing said wrapped product within a separable mold and applying pressure and heat thereto until the vulcanizable rubber is cured and all the rubber strips are homogeneously united; in removing the vulcanized tube from the mold and cutting the tube upon the ring-shaped member and reversing said tube inside out to place the interlayer of rubber under pressure; and finally in uniting the ends of said tube to produce an endless inflatable tube.

WILLIAM W. WILDMAN.